United States Patent Office 2,991,290
Patented July 4, 1961

2,991,290
N-ALKYLAMINO-α-HYDROXY-ALKANOIC ACID AMIDES
Seymour L. Shapiro, Hastings on Hudson, Louis Freedman, Mount Vernon, and Ira M. Rose, Yonkers, N.Y., assignors to U.S. Vitamin Corporation, a corporation of Delaware
No Drawing. Filed Mar. 20, 1957, Ser. No. 647,204
6 Claims. (Cl. 260—319)

This invention relates to aminoalkylamides of alpha-hydroxy organic acids of the structure shown below

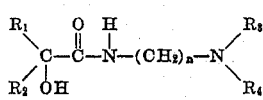    I

The group

may be written as A.

When the values $R_1$, $R_2$ and $n$ are selected within very narrow limits and when

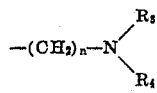

is a tertiary amino component, then the products are effective tranquilizers. They produce sedative without soporific effect when administered either orally or parenterally, as in the form of their salts.

The products, furthermore, have a very large margin of safety in such use; the ratio of the size of the lethal dose to the effective dose, for significant reduction of motor activity of test animals, is as high as 40–750:1 for representative ones of our compounds.

To obtain such results, it is necessary that $R_1$ and $R_2$ in the formula above be hydrogen, methyl, or other $C_1$–$C_4$ alkyl, $n$, 3–6 and for best results 3 or 4, and —$NR_3R_4$ a tertiary amino radical.

The invention comprises the new compounds of the Formula I and their salts, including the quaternary salts and tranquilizer compositions containing these products, either alone or in mixture with each other and in any case with an extender.

$R_3$ and $R_4$ in Formula I, more specifically, may represent the same or a different component including hydrogen, hydrocarbon radical such as a lower alkyl, cycloalkyl, aralkyl, or alkylene, oxyalkylene, haloarylalkyl, or aryl containing each 1–10 or up to 12 carbon atoms and forming, with the attached N, radicals that include dimethylamino, diethylamino, methylisopropylamino, methylbenzylamino, methyl (alpha-methylphenethyl) amino, ethylcyclohexylamino, ethylanilino, and such heterocyclic amine structures as indolinyl, tetrahydroquinolyl, and tetrahydroisoquinolyl.

The tertiary amino radical —$NR_3R_4$ includes those radicals in which $R_3$ and $R_4$ are joined either directly or through an oxygen atom to form N-heterocyclic radicals having 5–7 ring atoms illustrated by 1-piperidyl, 2-methyl-1-piperidyl, 1-pyrrolidyl, 1-hexamethylenimyl, 4-morpholinyl and the like.

Salts of the tertiary amine part of the molecule, i.e. of the amino group

of Formula I are part of the invention. They include those of the compound I with the pharmaceutically useful and physiologically acceptable (non-toxic) acids including such mineral acids as hydrochloric, nitric, sulfuric, hydrobromic, and phosphoric and organic acids such as acetic, tartaric, and malic and the salt with 8-chlorotheophyllin. The term "pharmaceutically useful" designates those acids whose salts are not substantially more toxic than the bases from which they are derived and which are compatible with various pharmaceutical extending media and solvents with which our products are compounded. In the salts, the

group becomes

HA in which HA represents an equivalent weight of the acid. When the acid used to form the salt of the amine is hydrochloric acid, for instance, then HA is HCl.

Among the quaternary compounds of the tertiary amino component of the compounds of the invention are salts with methyl iodide, bromide or chloride or methyl sulfate. In the following quaternary compounds

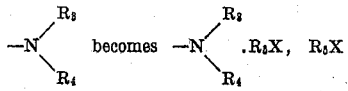

representing an equivalent proportion of the quarternizing agent. When this agent is methyl chloride, for example, then $R_5X$ is $CH_3Cl$.

GENERAL PROCESS OF MAKING DIALKYL-AMINOALKYLAMIDES

The dialkylaminoalkylamides (I) may be prepared by conventional methods. The intermediates or starting materials used are selected, as to groups that remain unchanged during the reaction, to contain the same groups that are to appear in the final product. The tertiary amines required as intermediates are provided as described in a later section.

Thus the esters (here the ethyl ester) of the alpha-hydroxy organic acid, when refluxed with the tertiary amine, gives the following reaction

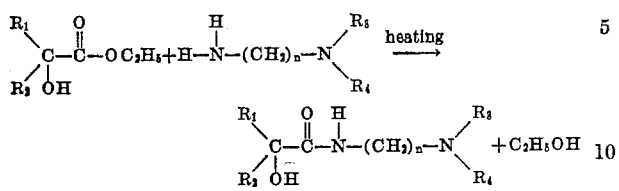

PERMISSIBLE AND TRANQUILIZING DOSAGES FOR ANIMALS

There follows a discussion of the lethal and tranquilizing dosages of a number of our representative materials as determined by animal tests.

*Lethal dosages.*—Toxicities have been established in terms of the minimum dose, milligrams of compound per kilogram of the test animals, which would be lethal to mice. This dose is subsequently abbreviated as LDmin. mg./kg. In Table I the compounds to be discussed are given a reference number and their lethal dosages are shown. Data on presently accepted materials (control compounds) are included for comparison. The result "1000+" means that a dosage in the ratio of 1000 mg. per kg. of mouse did not kill the mouse.

The compound, "Ref. No. 1" below was not toxic on oral administration to rats at dosages as high as 5000 mg./kg.

Table I.—*Values of components in the generic formula*

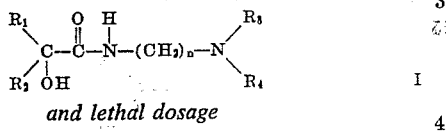

and lethal dosage

| Compound Ref. No. | LD min. mg./kg. | $R_1$ | $R_2$ | $R_3$ | $R_4$ | $R_5$ | X | n |
|---|---|---|---|---|---|---|---|---|
| 1 | 1,000+ | $CH_3$ | H | $CH_3$ | $CH_3$ | $CH_3$ | I | 3 |
| 2 | 400 | $CH_3$ | H | n-$C_4H_9$ | n-$C_4H_9$ | ------ | ------ | 3 |
| 3[1] | 1,000+ | H | H | $CH_3$ | $CH_3$ | (¹) | 2Br | 4 |
| 4 | 1,000 | $CH_3$ | $CH_3$ | $C_2H_5$ | $C_2H_5$ | ------ | ------ | 4 |

*Control compounds*

| | | |
|---|---|---|
| C1 | 750 | Meprobamate (2-methyl-2-n-propyl-1,3-propanediol dicarbamate). |
| C2 | 100 | Promizine (10-(3-dimethylaminopropyl)phenothiazine-hydrochloride). |
| C3 | (²) | Chlorpromizine (10-(3-dimethylaminopropyl)-2-chlorophenothizaine hydrochloride). |

¹ This is a bisquaternary containing 2 moles of I as shown plus 2 bromine atoms plus a divalent $R_5$ here

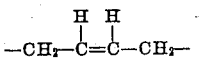

² The toxicity of this compound has been reported to be as low as 40 mg./kg. in the rat. J. Kopera, Brit. J. Pharm. and Chem. 9,392 (1954).

For characterization of tranquilizing effect on animals two kinds of tests were made as follows with the techniques, respectively, of the references cited.

*Effect on spontaneous activity.*—In this test, the drug is administered to a rat and the rat placed in a cage wired with a counter which is responsive to movement of the rat. The counter records and sums up the extent of spontaneous activity of the rat. The duration of the experiment is 18 hours. Each rat acts as his own control by being given a drug one day and saline the next day. At least six rats are used at each dose level tested. Activity of a drug is reported in Table II as average percent change from the control result. Cf. Castenara et al., J. Lab. Clin. Med. 45, 825 (1955); Isaac and Ruch, Science 123, 1170 (1956).

The compound Ref. No. 1, 2, etc. in the following tables as well as the controls are identified in Table I.

Table II.—*Effect on spontaneous motor activity*

| Compound Ref. No. | Dose mg./kg. subcutaneous | Dose mg./kg. oral | Reduction in activity, Percent |
|---|---|---|---|
| 1 | 10 | | 27 |
| 1 | | 30 | 35 |
| 2 | 10 | | 56 |
| 2 | | 20 | 34 |
| 3 | 20 | | 21 |
| 4 | 20 | | 11 |
| C1 (control) | 10 | | 0 |
| C1 (control) | | 100 | 0 |
| C2 (control) | 10 | | 41 |
| C2 (control) | | 20 | 54 |
| C3 (control) | 2.5 | | 33 |
| C3 (control) | 10 | | 71 |

Comparison of the data from Tables I and II for the control drugs with the compounds of this invention is favorable to our new tranquilizers.

*Effect of mescaline scratch.*—When mescaline is injected intraperitoneally into a mouse in the ratio of 100 mg./kg., the mouse will normally respond by scratching its body with its hind legs. The number of times the mouse repeats this operation in a specific time interval is counted. If an effective tranquilizing drug is administered 30 minutes before the mescaline, the drug will reduce or avoid entirely the scratch response as compared to control mice not receiving the drug. Results are noted and expressed in Table III as percent inhibition of scratch response as compared to control mice receiving mescaline alone. The dosage of drug required to reduce the number of scratches by 50% is reported as the effective dose in mg./kg. ($ED_{50}$ mg./kg.). At least 4 mice are tested at each dose level. Cf. Sturtevant, Proc. Soc. Exp. Biol. 92,383 (1956).

Table III.—*Reduction of mescaline scratch*

| Compound Ref. No. | $ED_{50}$ mg./kg. |
|---|---|
| 1 | 6.5 |
| 2 | 10 |
| C1 | 43 |
| C2 | 1 |
| C3 | 0.2 |

The experimental data above characterize the compounds of this invention as effective tranquilizing agents with essentially little or no toxicity in doses far above those required for the tranquilizing effect.

The overall procedure for the synthesis of the compounds of this invention has been described earlier herein. Compounds thus prepared are listed and characterized in Table IV.

In this Table $R_1$—$R_5$ n, and X have the meanings stated above. More specifically $R_5$ is an organic radical such as methyl, ethyl, allyl, carbethoxymethyl, benzyl, p-chlorobenzyl and the like. X is an anionic component of which examples are the halogens, methosulfate, and p-toluene sulfonate (tosylate). $R_5X$ as defined is a quaternizing agent. $R_5$ may also be hydrogen. In that case $R_5$ is an acid that forms a salt with the amine compound I. Ph is phenyl. In a few instances $R_3$ and $R_4$ jointly represent a bivalent group, the first of which shown in Table IV is —$(CH_2)_4$—. $R_5X$ when not shown to the contrary is zero, that is, not a component part of the structure described.

Table IV.—Hydroxyamides

Generic formula:

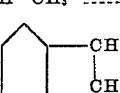

$R_1=R_2=H$  $n=3$

| $R_3$ | $R_4$ | $R_5X$ | B.p. °C. | Microns pressure | M.p., °C. |
|---|---|---|---|---|---|
| CH₃ | CH₃ | | 128 | 50 | |
| CH₃ | CH₃ | CH₃I | | | 124-5 |
| CH₃ | CH₃ | Br—CH₂CH=CHCH₂—Br (2 moles amide to 1 of R₅) | | | 158-159 |
| CH₃ | CH₃ | 8-Cl Theo [1] | | | 139-50 |
| C₂H₅ | C₂H₅ | | 140 | 50-100 | |
| i—C₃H₇ | CH₃ | | 134-8 | 30-70 | |
| n—C₄H₉ | n—C₄H₉ | | 155 | 30 | |
| —(CH₂)₄— | | | 151 | 30 | |
| —(CH₂)₄— | | CH₃I | | | 143-4 |
| —(CH₂)₂—O—(CH₂)₂— | | | 170-8 | 80-140 | |
| Cyclohexyl | CH₃ | | 170-80 | 70 | |
| Do | C₂H₅ | | 172-80 | 50 | |
| Ph—CH₂— | CH₃ | | 192 | 80 | |
| Ph—CH₂— | i—C₃H₇ | | 186-90 | 30-50 | |
| Ph—CH₂—CH—CH₃— | CH₃ | | 203-5 | 110 | |
| (cyclohexyl-CH₂CH₂) | | | 224-8 | 100-200 | |
| Ph | CH₃ | | 198-200 | 100 | |
| Ph | C₂H₅ | | 195-8 | 65-8 | |

[1] 8-chlorotheophylline anion.

$R_1=CH_3$, $R_2=H$, $n=3$

| $R_3$ | $R_4$ | $R_5X$ | B.p. °C. | Microns pressure | M.p., °C. |
|---|---|---|---|---|---|
| CH₃ | CH₃ | | 122 | 70 | |
| CH₃ | CH₃ | CH₃I | | | 123-4 |
| CH₃ | CH₃ | CH₃Cl | | | 151-2 |
| CH₃ | CH₃ | CH₃Br | | | 139-140 |
| CH₃ | CH₃ | PhCH₂Br | | | 156-157 |
| CH₃ | CH₃ | C₂H₅OCOCH₂Br | | | 151-152 |
| C₂H₅ | C₂H₅ | | 110 | 20 | |
| i—C₃H₇ | CH₃ | | 112-5 | 50 | |
| n—C₄H₉ | n—C₄H₉ | | 140-5 | 30 | |
| —(CH₂)₄— | | | 134-44 | 30 | |
| —(CH₂)₂—O—(CH₂)₂— | | | 142 | 40 | |
| —(CH₂)₂—O—(CH₂)₂— | | CH₃I | | | 145-6 |
| Cyclohexyl | CH₃ | | 164-70 | 30 | |
| Do | C₂H₅ | | 170 | 40 | |
| Ph—CH₂— | i—C₃H₇ | | 168-71 | 20-30 | |
| Ph—CH₂— | CH₃ | | 174-8 | 65-120 | |
| Ph—CH₂—CH—CH₃— | CH₃ | | 182 | 15 | |
| (cyclohexyl-CH₂CH₂) | | | 208-10 | 80 | |
| Ph | CH₃ | | 176 | 40 | |
| Ph | C₂H₅ | | 182-4 | 50-60 | |

$R_1=R_2=CH_3$  $n=3$

| $R_3$ | $R_4$ | $R_5X$ | B.p. °C. | Microns pressure | M.p., °C. |
|---|---|---|---|---|---|
| CH₃ | CH₃ | | 115 | 60 | |
| CH₃ | CH₃ | CH₃I | | | 170-1 |
| CH₃ | CH₃ | Ph—CH₂Cl | | | 202-3 |
| C₂H₅ | C₂H₅ | | 128 | 100 | |
| i—C₃H₇ | CH₃ | | 114-8 | 45 | |
| n—C₄H₉ | n—C₄H₉ | | 132-40 | 35 | |
| n—C₄H₉ | n—C₄H₉ | CH₃.CH₃SO₄ | | | 83-5 |
| —(CH₂)₄— | | | 114-24 | 25 | |
| —(CH₂)₄— | | C₂H₅OCOCH₂Br | | | 156-7 |
| —(CH₂)₂—O—(CH₂)₂— | | | 145 | 40 | |
| —(CH₂)₂—O—(CH₂)₂— | | CH₃ tosylate | | | 77-81 |
| Cyclohexyl | CH₃ | | | | 56-8 |
| Do | C₂H₅ | | 144-54 | 30 | 50-2 |
| Ph—CH₂— | CH₃ | | 160 | 200 | |
| Ph—CH₂— | i—C₃H₇ | | 154-66 | 40 | |
| Ph—CH₂—CH—CH₃— | CH₃ | | 174 | 30 | |
| Ph | CH₃ | | 164-9 | 50 | |
| Ph | C₂H₅ | | 164-70 | 30 | |

$R_1=R_2=H$  $n=4$

| $R_3$ | $R_4$ | $R_5X$ | B.p. °C. | Microns pressure | M.p., °C. |
|---|---|---|---|---|---|
| CH₃ | CH₃ | CH₃I | 142-9 | 90 | 107-8 |
| CH₃ | CH₃ | Br—CH₂—CH=CH—CH₂—Br (2 moles amide to 1 R₅X) | | | 174-6 |
| C₂H₅ | C₂H₅ | | 148-54 | 55 | |
| i—C₃H₇ | i—C₃H₇ | | 154 | 50 | |
| n—C₄H₉ | n—C₄H₉ | | 175 | 70 | |

Table IV.—Hydroxyamides—Continued $R_1=CH_3$  $R_2=H$  $n=4$

| $R_3$ | $R_4$ | $R_5X$ | Boiling point °C. | Microns pressure | M.p., °C. |
|---|---|---|---|---|---|
| CH$_3$ | CH$_3$ | | 124–31 | 30 | |
| C$_2$H$_5$ | C$_2$H$_5$ | | 132–6 | 30 | |
| i—C$_3$H$_7$ | i—C$_3$H$_7$ | | 138–42 | 60 | |
| i—C$_3$H$_7$ | i—C$_3$H$_7$ | CH$_3$ | | | 115–6 |
| n—C$_4$H$_9$ | n—C$_4$H$_9$ | | 156–60 | 75 | |

$R_1=R_2=CH_3$  $n=4$

| $R_3$ | $R_4$ | $R_5X$ | Boiling point °C. | Microns pressure | M.p., °C. |
|---|---|---|---|---|---|
| CH$_3$ | CH$_3$ | | 120 | 30 | |
| CH$_3$ | CH$_3$ | CH$_3$I | | | 134–6 |
| C$_2$H$_5$ | C$_2$H$_5$ | | 122–6 | 40–60 | |
| i—C$_3$H$_7$ | i—C$_3$H$_7$ | | | | 58 |
| i—C$_3$H$_7$ | i—C$_3$H$_7$ | CH$_3$I | | | 135–7 |
| n—C$_4$H$_9$ | n—C$_4$H$_9$ | | 144–8 | 60–80 | |

The amines of the type $$H_2N-(CH_2)_n-N\begin{matrix}R_1\\R_2\end{matrix}$$

used in synthesizing the amides of Table IV are either available commercially or are prepared as follows, for instance, in making the series of compounds in which $n=3$. Treat acrylonitrile with a secondary amine following established procedures. Reduce the nitrile so formed with sodium in alcohol or with an equivalent reducing agent, also following established procedures for this type of reaction.

Some of the nitriles so prepared for the reduction are shown in Table V.

Table V.—Dialkylaminopropionitriles (intermediates)
Generic formula:

$$\begin{matrix}R_3\\R_4\end{matrix}N-CH_2-CH_2-CN$$

| $R_3$ | $R_4$ | Boiling point °C. | Microns pressure |
|---|---|---|---|
| Cyclohexyl | CH$_3$ | 74 | 60 |
| Do | C$_2$H$_5$ | 64–8 | 40 |
| i—C$_3$H$_7$ | CH$_3$ | 86 | 8000 |
| 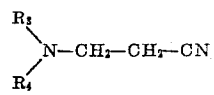 | CH$_3$ | 112–8 | 60–70 |
| Ph—CH$_2$ | CH$_3$ | 170 | 16 |
| Ph—CH$_2$ | i—C$_3$H$_7$ | 98–100 | 30 |
| Ph—CH$_2$—C(CH$_3$)H | CH$_3$ | 108–15 | 80–110 |
| Ph | CH$_3$ | 110 | 150 |
| Ph | C$_2$H$_5$ | 105–22 | 150 |

Amines prepared by reduction of nitriles such as those shown in Table V are given in Table VI.

Table VI.—Dialkylaminopropylamines
Generic formula:

$$\begin{matrix}R_3\\R_4\end{matrix}N-CH_2-CH_2-CH_2-NH_2$$

| $R_3$ | $R_4$ | Boiling point °C. | Microns pressure |
|---|---|---|---|
| Cyclohexyl | CH$_3$ | 60–6 | 40–60 |
| Do | C$_2$H$_5$ | 72–80 | 100–30 |
| i—C$_3$H$_7$ | CH$_3$ | 80 | 32 (mm.) |
| 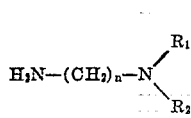 | CH$_3$ | 92–100 | 40–70 |
| Ph—CH$_2$ | CH$_3$ | 80–1 | 100 |
| Ph—CH$_2$ | i—C$_3$H$_7$ | 76–82 | 30–100 |
| Ph—CH$_2$—C(CH$_3$)H | CH$_3$ | 100–4 | 30–50 |
| Ph | CH$_3$ | 94 | 50 |
| Ph | C$_2$H$_5$ | 89 | 10 |

The intermediate aminoalkylamines where $n=4$ are available commercially but are also conveniently synthesized from the commercially accessible gamma-bromobutyronitrile by amination of bromine-bearing carbon and reduction of the gamma-tertiary aminonitrile thus formed to the substituted tertiary aminobutylamine.

The following examples of our syntheses are given for further illustration of the invention.

EXAMPLE 1

3 - (N-methylanilino) propylamine.—Beta(N-methylanilino) propionitrile (75., 0.46 mole) was dissolved in 900 ml. of absolute ethanol and heated to reflux. Sodium, 85 g. (3.68 mole) was added, in pieces, as quickly as possible (15–25 min.) and reflux was continued until all the sodium had dissolved (2–3 hrs.). The hot solution was steam distilled directly and 900 ml. of distillate removed. The formed product which separated in the pot was removed and dried over potassium hydroxide, filtered and distilled in vacuo, yielding 63.5 g. (85%) of amine boiling at 94°/50 microns.

EXAMPLE 2

3-benzylmethylamino propionitrile.—N-benzylmethylamine (72.5 g., 0.60 mole) was mixed with 35.2 g. (excess) of cold acrylonitrile and then 5 drops of "Triton B" solution were added. After refluxing for 4 hours and standing for 16 hours, the reaction mixture was fractionally distilled. There were obtained 93.8 g. (90%) of product boiling at 170°/16 mm. (Triton B is benzyltrimethyl ammonium hydroxide, 40% in methanol.)

EXAMPLE 3

*3-(1-indolino)propionitrile.*—A solution of 91.5 g. (0.77 mole) of indoline, 45 g. (excess) of acrylonitrile and 25 ml. of glacial acetic acid was refluxed for 2 hours, then cooled and diluted with 1 liter of ether. This solution was washed twice with 80 ml. of 30% potassium carbonate solution. The ether solution was then dried over powdered potassium carbonate, filtered and concentrated on the steam bath. The remaining volatile materials were removed under 1 mm. pressure and the residue distilled in vacuo, yielding 121.5 g. (94%) of product, B.P. 112-118°/0.06–0.07 mm.

EXAMPLE 4

*N - (morpholinopropyl) - alpha - hydroxy - isobutyramide.*—A solution of 28.8 g. (0.20 mole) of N-(3-aminopropyl)morpholine and 30 ml. of ethyl-alpha-hydroxy-iso-butyrate was refluxed over 5 hours and the formed ethanol removed during the course of the reaction. The residue was fractionally distilled yielding 42.0 g. (91.3%) of product boiling at 145°/0.04 mm.

*Anal.*—Calcd. for $C_{11}H_{12}N_2O_3$: N, 12.2. Found; N, 12.2.

The methyl tosylate, prepared in refluxing ethyl acetate, was recrystallized from a mixture of ethyl acetate, ethanol and ether, giving 27% of the quaternary salt, M.P. 77–81° C.

EXAMPLE 5

*N-(3-dimethylaminopropyl) lactamide.*—A solution of 20.43 g. (0.20 mole) of 3-dimethylaminopropylamine and 25 ml. of ethyl lactate was heated under reflux and the formed alcohol was removed by distillation. After 5 hours, volatile materials were removed in vacuo and the residue was fractionally distilled yielding 32.2 g. (92.5%) of product, B.P. 122°/0.07 mm.

The methiodide was prepared in refluxing acetonitrile. It crystallized out of solution on the addition of ethylacetate in 84% yield, M.P. 123–124° C.

*Anal.*—calcd. for $C_9H_{21}N_2O_2I$: C, 34.2; H, 6.7. Found: C, 34.3; H. 6.5.

EXAMPLE 6

*N - (4-di-iso-propylaminobutyl) lactamide.*—This was prepared as in Example 5, from 12.0 g. (0.070 mole) of 4-di-iso-propylamino butylamine and 15 ml. of ethyl lactate, yield 86%, B.P. 138–142° C./0.060 mm.

The methiodide prepared in ethanol, crystallized out of solution on dilution with ethylacetate in 70% yield, M.P. 115–116° C.

EXAMPLE 7

*N - (3-pyrrolidinopropyl) - alpha - hydroxy - iso-butyramide.*—This was prepared as in Example 4 from 12.0 g. (0.0936 mole) of 3-pyrrolidinopropyl amine and 15 ml. of ethyl alpha-hydroxy-iso-butyrate; yield, 77.8%, B.P. 114–124° C./0.025 mm.

The carbethoxy methobromide prepared in ethanol, crystallized out of solution on dilution with ethyl acetate in 76% yield, M.P. 153–155° C. Recrystallization from a mixture of ethylacetate and acetonitrile raised the M.P. to 156–157° C.

This compound has the structure

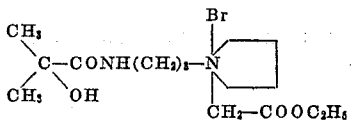

EXAMPLE 8

*N-(4-diethylaminobutyl)-glycolamide.*—This was prepared as in Example 5 from 18.0 g. (0.125 mole) of 4-diethylaminobutylamine and 15 ml. of ethylglycolate; yield, 82.5%, B.P. 148–154° C./0.055 mm.

EXAMPLE 9

*N - (3-dibutyl-aminopropyl) - alpha-hydroxy-iso-butyramide.*—This was prepared as in Example 4 from 18.6 g. (0.10 mole) of 3-dibutylaminopropylamine and 16 ml. of ethyl-alpha-hydroxy-iso-butyrate in 51% yield, B.P. 132–140° C./0.035 mm.

The methosulfate prepared in refluxing ethanol, crystallized on cooling and dilution with ether in yield 76%, M.P. 83–85° C.

*Anal.*—calcd. for $C_{17}H_{38}N_2SO_6$: S, 8.0 Found: S, 8.3.

EXAMPLE 10

*N-(3-cyclohexyl-methyl-amino-propyl)-alpha-hydroxy-iso-butyramide.*—This was prepared as in Example 4 from 17.0 g. (0.100 mole) of 3-cyclohexyl-methyl-amino-propylamine and 15 ml. of ethyl-alpha-hydroxy-iso-butyrate; yield, 81.8%, B.P. 140–148° C./0.06–0.07 mm. M.P. 56–58° C.

EXAMPLE 11

*N-[3-(1-indolino) propyl] glycolamide.*—This was prepared as in Example 5 from 17.6 g. (0.100 mole) of 3-(1-indolino)propylamine and 12 ml. of ethyl glycolate; yield 80.8%, B.P. 224–228° C./0.10–0.20 mm.

EXAMPLE 12

*N - (3 - cyclohexylethyl-aminopropyl) lactamide.*—This was prepared as in Example 5 from 14.0 g. (0.076 mole) of 3-cyclohexylethylaminopropyl amine and 12 ml. of ethyl lactate; yield 87.4%, B.P. 170° C./0.04 mm.

EXAMPLE 13

*N - (3 - methyl-iso-propylaminopropyl) glycolamide.*—This was prepared as in Example 5 from 10.5 g. (0.0807 mole) of 3-methyl-iso-propylaminopropyl amine and 12 ml. of ethyl glycolate; yield 75.7%, B.P. 134–1338° C./0.03–0.07 mm.

EXAMPLE 14

*N-(3-benzylmethylaminopropyl)lactamide.*—This was prepared as in Example 5 from 15.0 g. (0.084 mole) of 3-benzylmethylaminopropyl amine and 11 ml. of ethyl lactate; yield 88.2%, B.P. 174–178° C./0.065–0.12 mm.

EXAMPLE 15

*N-(3-ethylanilinopropyl) glycolamide.*—This was prepared as in Example 5 from 12.0 g. (0.0673 mole) of 3-ethylanilinopropyl amine and 9.0 ml. of ethyl glycolate; yield 83%, B.P. 195–198° C./0.065–0.080 mm.

EXAMPLE 16

*N-(3-methylanilinopropyl) lactamide.*—This was prepared as in Example 5 from 15.0 g. (0.0913 mole) of 3-methylanilinopropyl amine and 13.5 ml. of ethyl glycolate; yield 93.4%, B.P. 176° C./0.040 mm.

EXAMPLE 17

*N - (3 - benzyl-iso-propylaminopropyl) glycolamide.*—This was prepared as in Example 5 from 16.0 g. (0.0775 mole) of amine and 7.8 g. (0.0749 mole) of ethyl glycolate; yield 82.8%, B.P. 186–190° C./0.03–0.05 mm.

EXAMPLE 18

*N-(3-[Methyl-alpha-methylphenethyl] amino propyl) lactamide.*—This was prepared as in Example 5 from 8.0 g. ((0.0388 mole) of 3-(methylalpha-methylphenethyl)-aminopropyl amine and 9.0 ml. of ethyl lactate; yield 90.7%, B.P. 182° C./0.015 mm.

EXAMPLE 19

*N-(3-dibutylaminopropyl) lactamide.*—This was prepared as in Example 5 from 18.6 g. (0.10 mole) of 3-dibutylaminopropyl amine and 14 ml. of ethyl lactate; yield 82.5%, B.P. 140–145° C./0.03 mm.

Various quaternaries in the following Examples 20—21 were prepared by the general method of dissolving, in an appropriate solvent, the amine representing the final production in one of the examples above and then admixing an equivalent or a slight excess of a quaternizing agent of kind to supply the $R_5$ and X groups (see Table III) in the materials made in the examples below. Thus in this Example 20, the said agent was benzyl chloride.

EXAMPLE 20

The benzy chloride (quaternary) of N-(3-dimethylaminopropyl)-alpha-hydroxy-isobutyramide, prepared in ethanol, crystallized on dilution with ethyl acetate in 79.8% yield, M.P. 202–203° C.

EXAMPLE 21

The bis quaternary salt of 1,4-dibromobutene-2 and N-(4-dimethylaminobutyl)-glycolamide formed in ethanol in 94% yield, M.P. 174–176° C.

EXAMPLE 22

The aminoalkylamines of alpha-hydroxy organic acids representing the final product of Examples 1–19 are made into salts as follows:

Each one of the amines in turn is mixed with an equivalent weight of any one of the pharmaceutically acceptable acids described earlier herein, the mixing being made in contact with water, ethanol, ethyl acetate or like solvent in amount required, if any, to prevent undesired decomposition by the acid acting upon the said amine.

The salts so made are recovered by evaporation of the solvent at steam temperatures or lower. They may be recrystallized from the solvent by usual technique.

All of the final products of the examples above were submitted to ultimate analyses. The results for carbon, hydrogen and nitrogen agreed satisfactorily with the theoretical.

TRANQUILIZER COMPOSITIONS

For use in tranquilizing compositions, the aminoalkylamides of alpha-hydroxy organic acids are extended by being mixed with an excipient so that the excipient extends between the particles of the active agent. Examples of such active tranquilizer agents or principles that we use are any of the final products of Examples 1–22, any of the compounds listed in Table IV, their salts with hydrochloric, phosphoric, sulfuric, acetic, tartaric, or malic acid, or with any of the alkylhalide or other $R_5X$ quarternizing agents herein, examples of the latter being the methochloride, methobromide, and methoiodide of N-dimethylaminopropyllactamide.

The excipient used should be not only non-toxic under the conditions of use but also chemically inert towards the active principle. For oral administration they should be also at least reasonably palatable.

Excipients that meet the requirements and that may be used are the solid materials such as gum acacia, carboxymethyl cellulose, lactose dextrose and dextrine. The mixed active principle and excipient may be tableted with usual technique and equipment.

When the tranquilizer is to be administered by injection, then the excipient or extender is a liquid solvent for the active principle. Water is satisfactory. There is no need to complicate the administration by the use of other liquid for this purpose.

The proportion of the active principle to the selected excipient may be varied over a wide range, as, for instance, from 5–50 parts by weight of the tranquilizing agent to 100 of the excipient. In making a solution for injection, the proportion of the said agent should not be above the saturation quantity, so that the agent dissolves in the excipient and remains dissolved during the injection step.

It is to be understood that it is intended to cover all changes and modifications of the examples of the invention herein chosen for the purpose of illustration which do not constitute departures from the spirit and scope of the invention.

What is claimed is:

1. Aminoalkyleneamide bases having the formula:

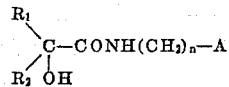

and salts thereof, in which $R_1$ and $R_2$ are selected from the group consisting of hydrogen and alkyl radicals having from one to four carbon atoms, n is an integer of from three to six, and A is selected from the group consisting of (1)

in which each of $R_3$ and $R_4$ is selected from the group consisting of alkyl radicals having from one to four carbon atoms, cyclohexyl, phenyl and phenylalkyl radicals containing from one to three carbon atoms in the alkyl group thereof, and (2) N-heterocyclic radicals selected from the group consisting of 1-indolinyl, tetrahydroquinolyl, tetrahydroisoquinolyl, 1-piperidyl, 2-methyl-1-piperidyl, 1-pyrrolidyl, 1-hexamethylenimyl, and 4-morpholinyl.

2. The compound

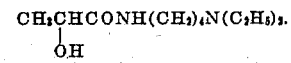

3. The compound

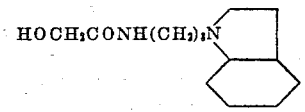

4. The compound

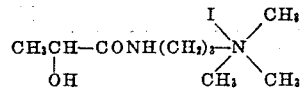

5. The compound

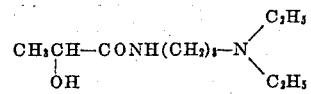

6. The compound

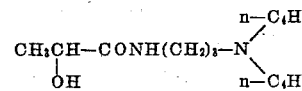

References Cited in the file of this patent

UNITED STATES PATENTS

| | | |
|---|---|---|
| 2,009,144 | Miescher et al. | July 23, 1935 |
| 2,425,392 | Robinson et al. | Aug. 12, 1947 |
| 2,715,645 | Cusic | Aug. 16, 1955 |
| 2,733,256 | Krapcho et al. | Jan. 31, 1956 |
| 2,820,801 | De Benneville et al. | Jan. 21, 1958 |
| 2,826,578 | Perron | Mar. 11, 1958 |

OTHER REFERENCES

Klarer et al.: Helv. Chim. Acta, vol. 27 (1944), pp. 1762–1776.